(12) United States Patent
Cras et al.

(10) Patent No.: US 7,356,779 B2
(45) Date of Patent: *Apr. 8, 2008

(54) ANALYTICAL REPORTING ON TOP OF MULTIDIMENSIONAL DATA MODEL

(75) Inventors: Jean-Yves Cras, Paris (FR); Henri Biestro, Saint Cloud (FR); Ricardo Polo-Malouvier, Levallois-Perret (FR)

(73) Assignee: Business Objects Software Ltd., Dublin 1 (IE)

(*) Notice: Subject to any disclaimer, the term of this patent is extended or adjusted under 35 U.S.C. 154(b) by 497 days.

This patent is subject to a terminal disclaimer.

(21) Appl. No.: 11/000,597

(22) Filed: Nov. 30, 2004

(65) Prior Publication Data

US 2005/0080802 A1    Apr. 14, 2005

(51) Int. Cl.
*G06F 3/00* (2006.01)

(52) U.S. Cl. .............. 715/853; 715/968; 715/848; 707/102

(58) Field of Classification Search ............... 715/968, 715/810, 835, 848, 849; 707/102
See application file for complete search history.

(56) References Cited

U.S. PATENT DOCUMENTS

| | | | |
|---|---|---|---|
| 5,852,819 A | | 12/1998 | Beller |
| 5,905,985 A | * | 5/1999 | Malloy et al. ............... 707/100 |
| 5,943,668 A | * | 8/1999 | Malloy et al. ................ 707/3 |
| 6,556,226 B2 | | 4/2003 | Gould et al. |
| 6,581,068 B1 | | 6/2003 | Bensoussan |
| 6,615,202 B1 | | 9/2003 | Ding et al. |
| 6,631,382 B1 | | 10/2003 | Kouchi et al. |

* cited by examiner

*Primary Examiner*—Kieu D. Vu
(74) *Attorney, Agent, or Firm*—Cooley Godward Kronish

(57) ABSTRACT

An analytical reporting functionality provides full-fledged dynamic reporting capabilities on top of a multidimensional data model. A GUI facilitates replicating the same reporting data for various elements of a dimension. Additionally, direct interaction with the report to perform OLAP-style is enabled.

15 Claims, 10 Drawing Sheets

Document contains one or more reports.

Section at the same level

Nested section

| | | Yes |
|---|---|---|
| Values Mode | When dragging dimensional or detail objects or values to the section zone with no existing sections but with an existing block, a line appears to denote where the start of the section will be (note: users cannot drop measures to this zone). Instead of the object icon, a pop up help saying "Drop here to create a section" should be displayed.<br><br>*Drop to create Section <Year>*<br><br>| Country | Sales |<br>|---|---|<br>| USA | 2,000.00 |<br>| France | 1,500.00 |<br>| Italy | 800.00 | | Inserts all dimension or detail object's values (one section for each object dropped) as sections, which begins before the block and ends after the block. In the case of dropping multiple objects, the second section will begin immediately after the first section and end immediately before the end of the first section. See adding section when section already exists.<br><br>1999<br><br>| Country | Sales |<br>|---|---|<br>| USA | 2,000.00 |<br>| France | 1,500.00 |<br>| Italy | 800.00 |<br><br>1998<br><br>| Country | Sales |<br>|---|---|<br>| USA | 1,800.00 |<br>| France | 1,300.00 |<br>| Italy | 500.00 | | Inserts dimension or detail values (one section for each different associated object of values dropped) as sections, which begins before the block and ends after the block. In the case of dropping multiple objects, the second section will begin immediately after the first section and end immediately before the end of the first section. See adding section when section already exists.<br><br>1998<br><br>| Country | Sales |<br>|---|---|<br>| USA | 2,000.00 |<br>| France | 1,500.00 |<br>| Italy | 800.00 | |

*FIG. 9*

| 1) Action<br>None | Result<br>[T₁] [T₂] |
|---|---|
| 2) D&D level<br><Country> | section <Country><br>[COUNTRY]<br>[T₁] [T₂] ••<br>end section <Country> |
| 3) D&D member<br><USA> | section <Country><br>[COUNTRY] [▽]<br>[T₁] [T₂] ••<br>end section <Country> |
| 4) D&D level<br><State> | section <Country><br>[COUNTRY] [▽]<br>[T₁] [T₂] ••<br>section <State><br>[STATE]<br>[T] [T₂] ••<br>end section <State><br>end section <Country> |

*FIG. 10A*

Filter Definition Wizard

Filter name: STATE

Object to filter:
SALES REV. ▷

Keep:  ● Top  ○ Bottom  ○ Top & Bottom

Choose an expression:
○ Constant
○ Values
○ Prompt
● Top(n)/Bottom(n)

● Number       [ 10 ] ◁▷
○ Percent      [      ]
○ Cumulative Sum [    ]

Help
Keeps top/bottom set number of values:

[ OK ]  [ Cancel ]  [ Help ]

Note: The Help section changes depending on the selection (Number, Percent, Cumulative sum).

| Property | Help Text |
|---|---|
| Number | Keeps top/bottom set number of values |
| Percent | Keeps values until sum is the percentage of total |
| Cumulative Sum | Keeps values until sum is the set value |

*FIG. 10C*

ANALYTICAL REPORTING ON TOP OF MULTIDIMENSIONAL DATA MODEL

CROSS-REFERENCES TO RELATED APPLICATIONS

This application claims priority from U.S. Provisional Application No. 60/194,232, filed on Apr. 3, 2000, entitled "System for Analyzing Multidimensional Computer Databases." This application is also related to U.S. patent application No. 09/826,426, filed Apr. 3, 2001, entitled "Report then Query Capability Multidimensional Database Model, and 09/826,425, filed Apr. 3, 2001, entitled "Mapping of an RDBMS Schema onto a Multidimensional Data Model. The above applications and their disclosures are incorporated herein by reference for all purposes.

BACKGROUND OF THE INVENTION

The present invention relates to information processing and particularly to creating dynamic interactive reports.

Relational database systems are well-known in the prior art, and include tabular structures and structured query languages used for database queries. To aid in an understanding of the present invention, a glossary of terms is included hereinbelow. Relational database technology has made possible an independence between the way data is physically stored and the way it can be handled logically. Relational technology has been widely accepted in business, industry and engineering as valuable for storing data.

Database systems may also be implemented in technology termed OLAP (On-Line Analytical Processing). A key feature of OLAP is a multidimensional view of data. These databases expose data not as entities and associations, as does a Relational Database System, but as sets of values organized in a so-called hypercube. This hypercube structure allows for easy access to data along different dimensions. For instance, a multidimensional database can organize numeric data along three dimensions: Product, Geography, Measures. The product dimension reflects the hierarchy of products in the organization, for example, Consumer and Enterprise products being further divided into more precise product categories down to the final product SKU. The Geography dimension will reflect the corporate organization from the entire company to countries to sales district or ZIP codes. Last, the Measures dimension captures more or less detailed sources of income and expenses, such as sales revenue, maintenance revenue (that may be grouped in a common "revenue" category), or operational expenses. These three dimensions define a system of coordinates. For each valid set of coordinates in this system such as, for example, "All Products," "US," "Revenue," the multidimensional database is able to retrieve a single value (numeric in most cases) that represents the aggregated value of the specified measure for the specified dimension coordinates.

Another feature of OLAP is various analysis models such as parameterized static reporting, slicing and dicing with drill down, "what if" analysis and goal seeking models. These analysis models are provided by standard OLAP tools. These tools serve analytical purposes such as allowing users to select which coordinates in which dimension they want to consider, and must often prompt the user interaction with data through a user interface component called a "grid." A grid allows for easy navigation in a multimensional cube and enables "drill-down" (descending the hierarchy in a dimension and getting a more detailed view of the data).

From a user perspective, a most important feature of database management software is the user interface and reporting capability. Reports generally present results in user friendly formats, such as graphs, tables, crosstabs, or forms. A novel technique for providing a semantic layer for interpreting and interacting with a relational database is disclosed in commonly assigned U.S. Pat. No. 5,555,403 entitled "Relational Database Access System Using Semantically Dynamic Objects," which is hereby incorporated by reference for all purposes.

OLAP products generally provide powerful analytical and navigation tools such as drill down/up, rotation, and slicing and dicing data to provide different views of the data. However, the reporting capabilities of these products are not well developed.

Glossary:

The following is a glossary of some of the terms used in these technologies.

Data: Raw facts or values which are physically recorded and which can be extracted and objectively verified Information: Anything learned from data, the "meaning" of the data.

Value: An amount of worth

Database: A computerized collection of data

Relational Database: A database in which all data are stored and organized in tables and in which each field containing a datum is equally accessible.

Relational Database Management System (RDBMS): The software environment supporting a Relational database.

Relational Database Terms:

Record: A collection of fields; the basic accessible element of a file.

Field: An elemental entity of a record.

Relation: An orderly arrangement of data in columns and rows; a table.

Attribute: A column of a relation, a field of a Tuple.

Tuple: A record of a relational database; one line or row of a table or relation.

Relational Structure: Set of Relations definitions

Business Objects Specific Terms:

Infocenter: Environment in which the Users, without any technical knowledge, have "self-service" access to the information system, in a manner controlled by MIS staff.

Universe: An easy-to-understand partial or total representation of the database, designed for a particular application or group of users.

Business Objects: Objects corresponding to concepts close to the user's everyday business. They are defined by the Infocenter Manager and are the basic elements of a Universe.

Context: set of logical equations linking tables (joins) providing a closed graph of table.

OLAP Terms:

Metadata: Data about data. How the structure and calculation rules are stored, plus, optionally, additional information on data sources, definitions, transformations, quality, date of last update, user privilege information, etc.

Hypercube: An OLAP product that has all data stored in a single cube that has all dimensions applied to it.

Dimension: A structural attribute of a cube which is a list of members, all of which are a similar type in the user's perception of the data. A dimension acts an index for identifying values in a multi-dimensional array.

Cell: A single data point that arises by selecting one member from each dimension of a multi-dimensional array.

Minicube. A subset of the hypercube with fewer dimensions than the encompassing hypercube.

Multi-Dimensional Array: A group of cells arranged by the dimensions of the data.

Drill Up/Down: Drilling up or down is a specific analytical technique whereby the user navigates among levels of data ranging from the most summarized (up) to the most detailed (down).

Slice: A subset of a multi-dimensional array corresponding to a single value of one or more dimensions not in the subset.

Slice and Dice: A method of navigating by calling for page displays interactively through the specification of slices via rotations and drill down/up.

BRIEF SUMMARY OF THE INVENTION

According to one aspect of the invention, a method for performing analytical reporting on top of a multidimensional data model enables a dimension object to be associated with a reporting block, such as a table, crosstab, or chart. The reporting block inherits the data definition of the associated dimension object.

According to another aspect of the invention, each reporting replicates the same set of reporting data for each element of the associated dimension object.

According to another aspect of the invention, dimension objects can be nested so that the reporting object inherits the data definition of both dimension objects.

According to another aspect of the invention, the reporting object is synchronized to the dimension object to display reporting data for each member of the dimension.

According to another aspect of the dimension, OLAP-style analysis is enabled through direct interaction with a report format.

According to another aspect of the invention, the GUI enables associated dimension objects to be filtered by selected member data so that report data is only replicated for selected members.

Other features and advantages of the invention will now be apparent in view of the following detailed description and appended drawings.

BRIEF DESCRIPTION OF THE DRAWINGS

FIGS. 8-10 depict the use of the user interface to define sections that replicate the same set of reporting data for various levels of a dimension.

DESCRIPTION OF THE SPECIFIC EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications, and equivalents, which may be included within the spirit and scope of the invention as defined by the appended claims. No assumption is made on how the data is physically stored. It can be stored into a relational or multidimensional database. For instance, if a relational database is presented as a multidimensional data model as described above, the invention provides the same enhanced reporting capabilities. In one preferred embodiment, the present invention is a software implementation using a three-tiered architecture for providing improved access and reporting on top of a relational or multidimensional database.

The present invention can be utilized in a PC (personal computer) environment, such as is manufactured by International Business Machines Corporation, Apple Corporation, and the like. In addition, all interaction is possible using a "mouse" or the equivalent, and it is to be understood that the following detailed description of the various uses of the improved database accessing capability of the present invention could be realized utilizing such a PC-type configuration.

Figure 1:
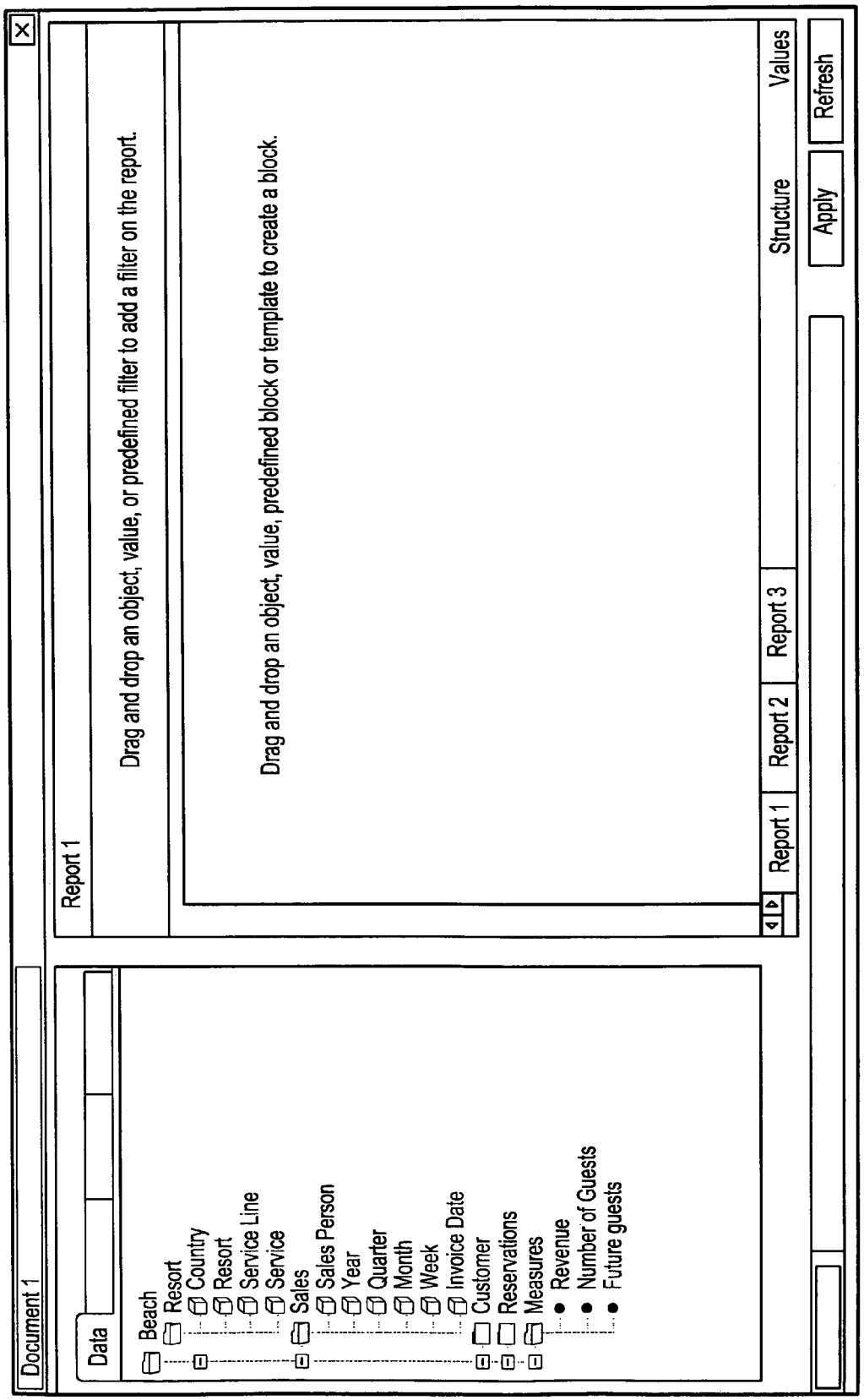
FIG. 1 depicts an outline view of a graphical user interface (GUI) utilized in a preferred embodiment to enable analytical reporting.

FIG. 1 depicts an outline view of a graphical user interface (GUI) utilized in a preferred embodiment to analytical reporting. Referring now to FIG. 1, an outline browser is displayed in the left window and a report area is displayed in the right window.

Figure 2:
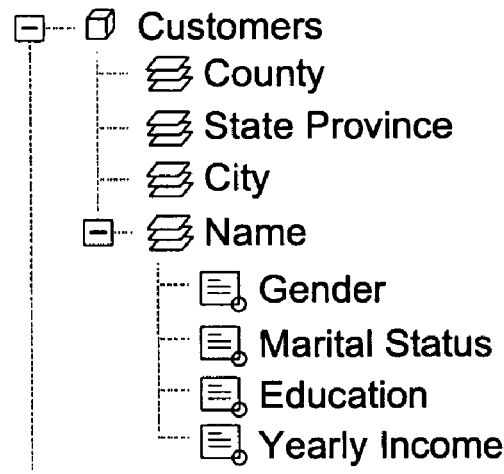
FIG. 2 is a tree depicting a first level of metadata including dimensions and levels.

FIG. 2 depicts a first level of metadata including universes and dimensions. The metadata objects that define a universe are: Class, Dimension, Detail, Measure and Member. The details of a universe are described in detail in the above referenced patent. In the present embodiment, a universe is represented as class and objects.

Figure 3:
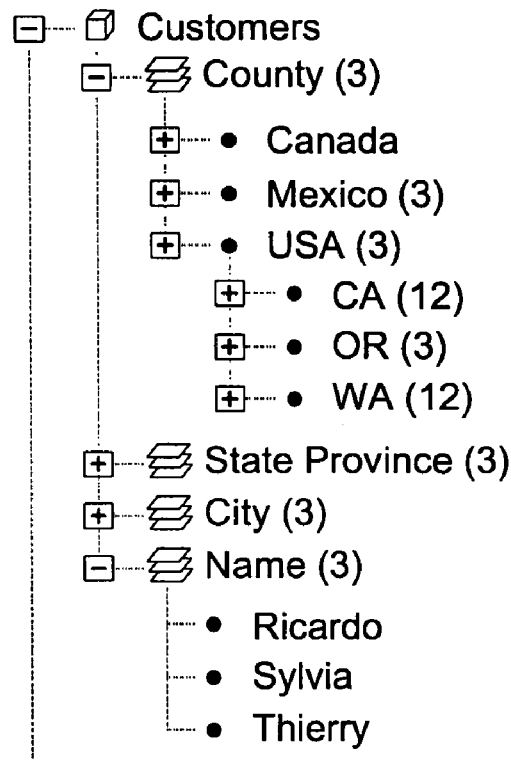
FIG. 3 is a tree showing the hierarchy for Customer dimension in more detail.

The metadata dimensions objects that define an OLAP dimension are: Dimension, Level, Hierarchy, Member, and Measure. FIGS. 2 and 3 depict the hierarchical structure of a dimension, in this example, customers. The Customer dimension includes the levels County, State, City, and Name. Also, the properties for members in the Name level are depicted. FIG. 3 shows the hierarchy for Customer dimension in more detail, showing the members of each level. Additionally, the children of the member USA are depicted.

Referring back to FIG. 1, reporting objects can be created by dragging and dropping objects from the Outline Browser Zone to the Report zone. The user interface of the present embodiment allows for arbitrary nesting of objects. For instance, it is possible to insert a table object into a matrix object, so that each intersection of lines and columns in the matrix will contain an instance of the dropped table. It is also possible to introduce "nested axes" in a Table by simply dropping two different dimension objects onto a specific place in the table. Only a few drag-and-drop operations are needed to build such complex reports. The order in which objects are combined does not matter in most cases, which leads to a much easier and intuitive report building process. The data outline mode is controlled by two radio buttons, which determine whether the user browses metadata the objects structure mode or values mode.

Figure 4:
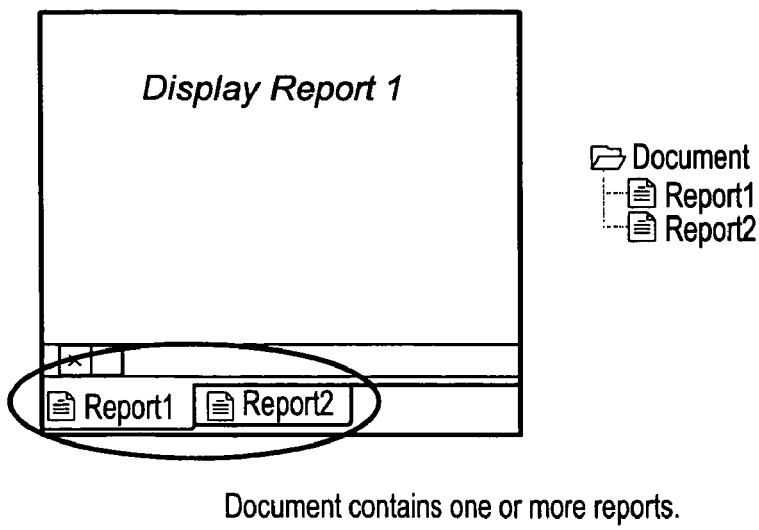
FIG. 4 depicts a document which is a container for one or more working areas called reports.
Figure 5:
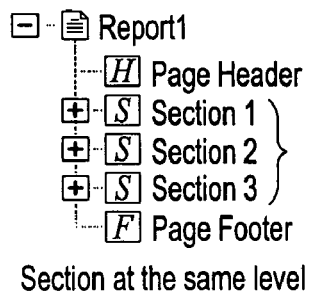
FIGS. 5 and 6 are trees depicting two or more sections at the same level (parallel sections) or at sub-levels (nested sections).
Figure 6:
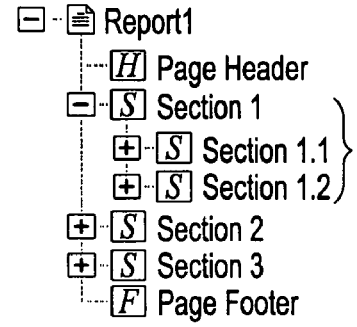

The organization of a document utilized in a preferred embodiment of the invention will now be described. FIG. 4 depicts a document which is a container for one or more working areas called reports. A section defines a specific area on a report and is composed of zero or more reporting objects. As depicted in FIGS. 5 and 6 there can be two or more sections at the same level (parallel sections) or at sub-levels (nested sections). Reporting objects included in a section can be blocks such as tables, crosstabs, and charts.

Each reporting object has an associated data definition. Data definitions included in the currently described embodiment are: an axis defined as crossjoin of one or more dimensions, a filter which is an object that selects members; and, a break which is defined as one axis or subpart of an axis available in the table or crosstab. Each reporting object inside a document has one associated logical cube defined by all axes and filters associated with the reporting object.

Data definitions of reporting objects interact through inheritance. In this embodiment, the general rule is that when a reporting object is nested within another reporting object then the nested reporting object inherits the data definition associated with the parent reporting object. Thus, all blocks within a section are synchronized to the data definition of the section.

According to one embodiment of the invention, the user interface of FIG. 1 is utilized to define sections that replicate the same set of reporting data for various elements of a dimension. These sections can be homogeneous (e.g., one section item for each country) or heterogeneous (e.g., one section item for entire U.S. and one for each of the top ten contributing states). As described above, when a section is defined that includes nested blocks then the nested blocks inherit the data definition associated with the section.

Figure 7:
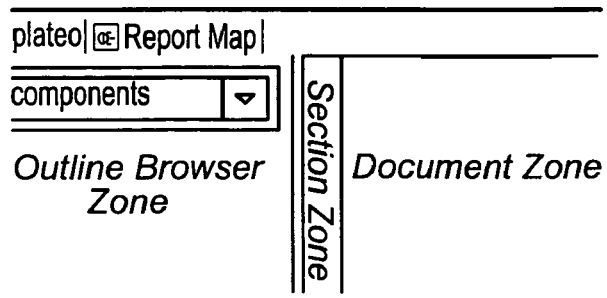
FIG. 7 is a detailed view of a portion of the user interface depicting a Section Zone, an Outline Browser zone, and a Document Zone.

Examples of analytical reporting utilizing the user interface of FIG. 1 and a drag and drop protocol will now be described. FIG. 7 is a detailed view of a portion of the user interface depicting a Section Zone, an Outline Browser zone, and a Document Zone.

Figure 8:
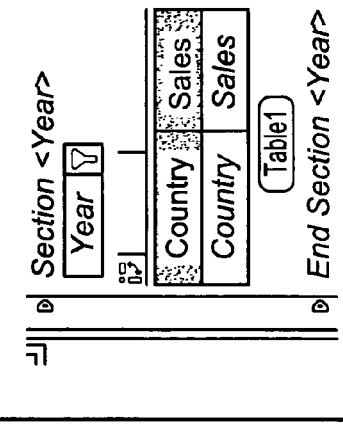

The use of the user interface to define sections that replicate the same set of reporting data for various elements of dimension is illustrated by FIG. 8-10. In FIG. 8 a block, in this example a chart, already exists in the document zone. FIG. 8 depicts a chart in the structure mode so that only the header and footer are displayed. In the following example the metadata depicted in the Outline Browser Zone of FIG. 1 are used. In this example, referring to the center panel of FIG. 11, the dimension <Year> is dragged into the Section zone to create a new section having the data definition defined by the object year. As described above, the blocks in the section inherit the data definition of the section. Thus, the block in the form of Table 1 will now inherit the data definition of the year dimension.

As depicted in the center panel of FIG. 9, in the Values Mode a different chart is displayed for each value of the year dimension. In this case, a chart showing Country and Sales is produced for each value of the Year dimension, so that the values of Country and Sales displayed in each chart are synchronized with the corresponding values of the members of the Year dimension.

Figure 10B:
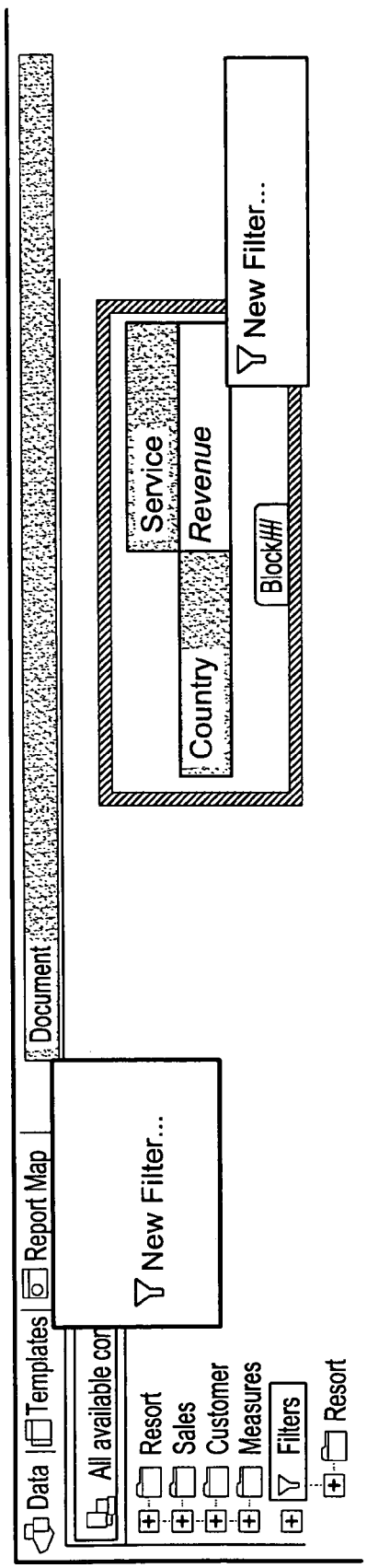

FIGS. 10A-C illustrate an example where there is one section for a particular country, e.g., USA, and sections for the top ten contributing states in terms of sales. As depicted in FIG. 10A, a first section is created (step 2) by dragging the value USA from the Country level of the Customer dimension (see FIG. 3). As described above, the tables (T1, T2, . . . ) will inherit the data definition of the Country level and will be synchronized along that axis. A filter is then created (step 3) for the country by dragging and dropping the member USA on top of the country cell.

A nested section is then created (step 4) by dragging and dropping the State level between the section <Country> tokens. The tables in the nested section will inherit the data definitions of both the filtered Country and State levels.

A filter on the state level is then created by, in this embodiment, utilizing the filter creation GUI depicted in FIGS. 10B and C. The user right clicks on the State cell and selects the new filter sub-menu (FIG. 10B) which causes the filter definition wizard (depicted in FIG. 10C) to be displayed. Note that objects can be filtered by Constant, by Values, by a Prompt, or from the top and bottom. In this example "Top" and "10" are selected and objects are filtered by sales revenue so that the tables will displayed having values for each of the top ten states in terms of sales revenue.

Figure 11:
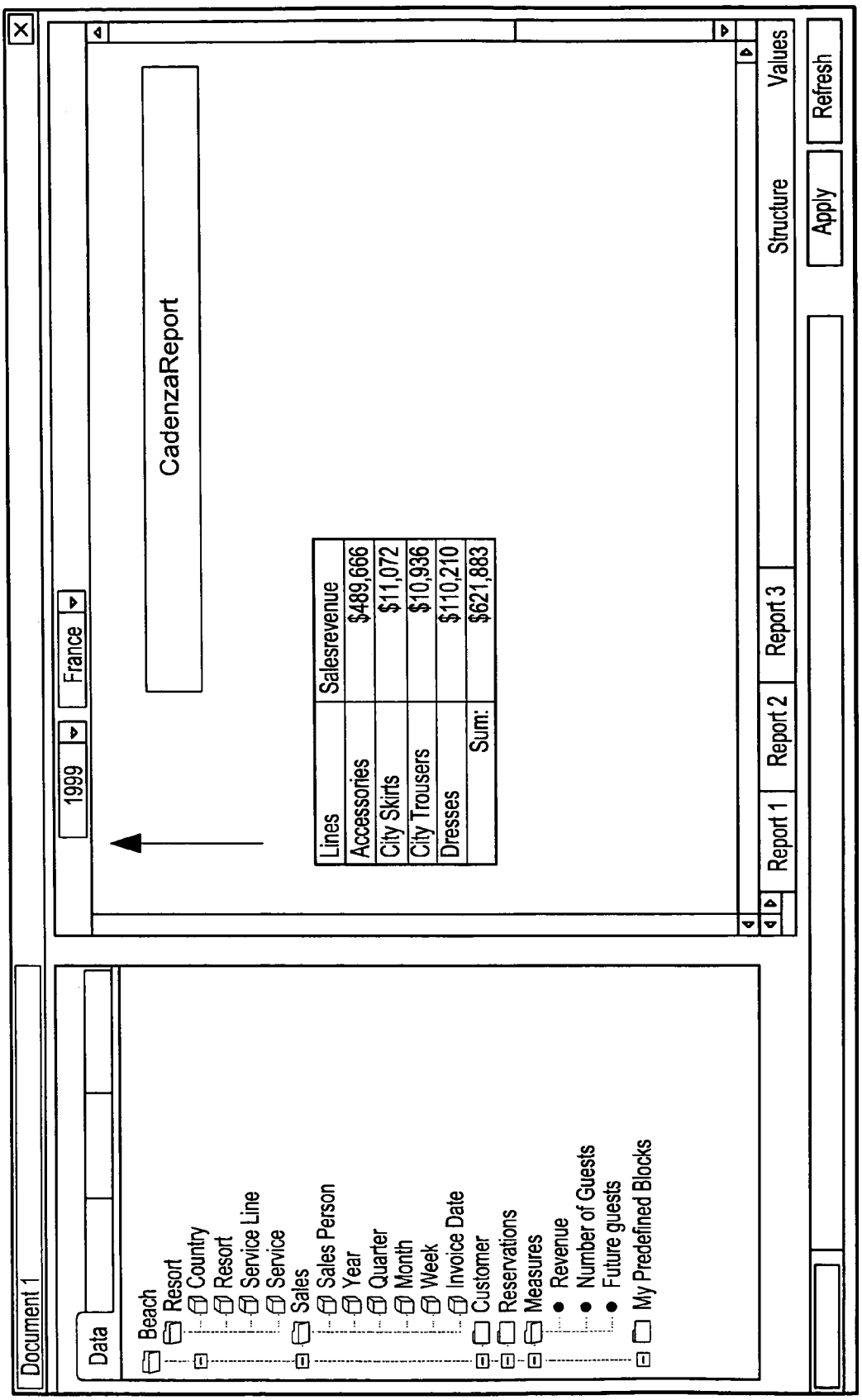
FIG. 11 depicts a user interface for enabling OLAP-style data analysis with a report.

Another feature of the currently described embodiment is the enablement of direct user interaction with a report to perform the same analysis that would be performed by an OLAP tool. FIG. 11 depicts a user interface for enabling OLAP-style data analysis with a report. The magnifying glass with "+" defines the "Drill and Replace" mode which is the default mode. The expansion icon with the "+" and "−" selects either "Drill and Replace" or "Drill and Expand."

Figure 12:
FIG. 12 depicts the cursor changed to magnifying glass to allow drill down when the "+" appears inside the magnifying glass.

Interaction with cells or blocks is enabled utilizing various GUI techniques. For example, as depicted in FIG. 12, the cursor can be changed to magnifying glass to allow drill down when the "+" appears inside the magnifying glass. When the cursor is over a cell where no drill down is possible, but a drill up is possible, the "+" inside the magnifying changes to a "−".

Figure 13:
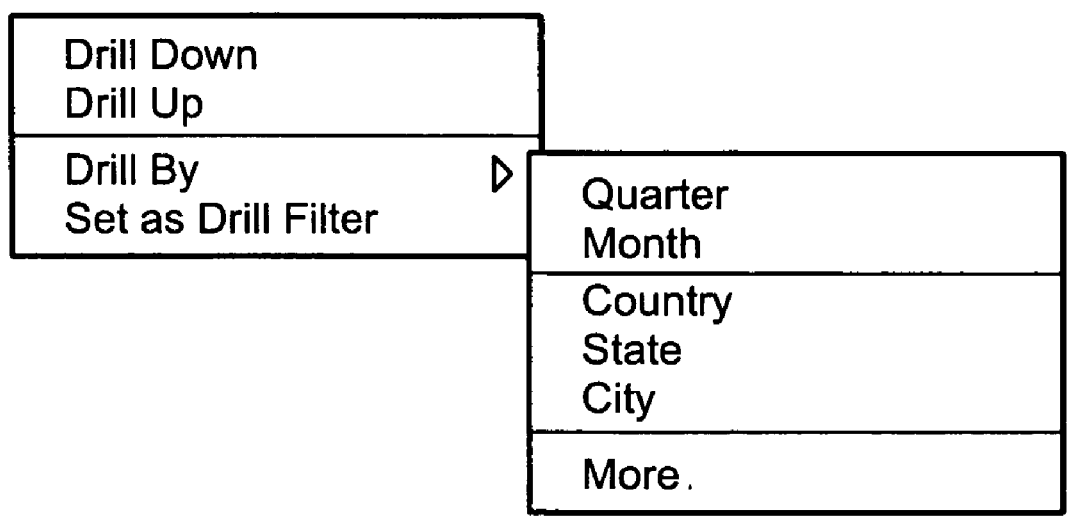
FIG. 13 depicts contextual menus that can be activated, for example by right clicking a cell, to enable OLAP-style data analysis on report blocks

Alternatively, as is known in the art, contextual menus, as depicted in FIG. 13, can be activated, for example by right clicking a cell, to enable OLAP-style data analysis on report blocks.

In a preferred embodiment, the processes described above realized in software, stored on a computer readable medium, executed by a processor. The storage medium can be magnetic or optical storage and includes digital signals encoded in an electromagnetic signal.

The invention has now been described with reference to the preferred embodiments. Alternatives and substitutions will now be apparent to persons of skill in the art. For example, although the embodiment described created sections utilizing a drag-and-drop GUI technique, contextual menus or other GUI techniques can be utilized. Accordingly, it is not intended to limit the invention except as provided by the appended claims.

What is claimed is:

1. A method for performing analytical reporting on top of a multidimensional data model built on top of a relational or multidimensional database, comprising:

displaying a reporting object that displays values from one or more axes of the multidimensional data model;

displaying a hierarchical view of at least a part of a hypercube in the multidimensional data model showing dimensions and dimension members of the hypercube;

using a user interface to associate a first dimension object with a reporting object; and displaying a set of reporting objects, each corresponding to a member of a dimension, where the reporting object displays values of measures of the corresponding dimension member including multiple blocks synchronized along a common axis, nested sections, and breaks.

2. The method of claim 1 further comprising:
displaying an analysis user interface;
selecting a cell of said reporting object; and
utilizing a GUI tool to select an OLAP analysis action to be performed on the cell.

3. The method of claim 2 further comprising selecting the OLAP analysis action to be drill down or drill up.

4. The method of claim 1 further comprising associating a specific member of the first dimension object with the first dimension object to select only the specific member when displaying the reporting object.

5. The method of claim 1 further comprising associating a second dimension object, nested under the first dimension object, with the reporting object; and defining a filter to sort the second dimension object according to a specified criteria.

6. A computer program product for performing analytical reporting on top of a multidimensional data model built on top of a relational or multidimensional database "the computer program product being stored on a computer readable medium having program code embodied therein, said program code further", comprising:
program code executed by a processor for displaying a reporting object that displays values from one or more axes of the multidimensional data model;
program code executed by the processor for displaying a hierarchical view of at least a part of a hypercube in the multidimensional data model showing dimensions and dimension members of the hypercube;
program code executed by the processor for enabling a user interface to associate a first dimension object with the reporting object; and
program code executed by the processor for displaying a set of reporting objects, each corresponding to a member of the dimension, where the reporting object displays values of measures of the corresponding dimension member including multiple blocks synchronized along a common axis, nested sections, and breaks.

7. A computer-implemented method for building complex analytic reports on top of multidimensional data models, the method comprising:
providing a catalog of available reporting objects, wherein each reporting object is a graphical entity comprising a plurality of graphical areas, at least one of the plurality of graphical areas having: zero, one or more axes, the axes fit for receiving one or more OLAP dimensions or levels, and
zero, one or more containers, the containers fit for receiving a plurality of items including one or more OLAP dimensions, levels, measures, free text or other reporting objects, the plurality of items to be embedded into a reporting object;
displaying a catalog of OLAP entities comprising dimensions, level and/or measures;
creating a report using a first reporting object with no axis and one or more containers;
allowing a user to select a reporting object from the catalog of available reporting objects, and placing the selected reporting object onto the report or onto a container or area of a reporting object already included as part of the report;
allowing a user to select a dimension or level from the catalog of available OLAP entities and placing the selected dimension or level onto an axis area of a reporting object already included as part of the report;
allowing the user to select a dimension, level or measure from the catalog of available OLAP entities and placing the selection onto a container area of a reporting object already included as part of the report or onto the report itself, with the effect of inserting a cell containing the selected OLAP entity into the container; and
displaying a rendition of the report;
wherein at least one of the reporting objects in the report is a section, the container of which contains at least two different reporting objects with the axes or containers of both contained reporting objects different from each other.

8. The method of claim 7 with nested reporting objects inherit a data definition associated with a parent reporting object.

9. The method of claim 7 wherein at least one of the reporting objects in the report has both an axis and a container that in turn contains a complex reporting object with an axis.

10. The method of claim 7 wherein the at least one of the plurality of graphical areas includes graphical information describing the nature, format and expected rendition of the reporting object to be used for rendering the report.

11. The method of claim 7 wherein arbitrary sets of members of a dimension, or pre-existing calculated members, are placed in an axis, resulting in restricting the report to a subset of the available dimension members.

12. The method of claim 7 further comprising:
selecting an existing reporting object in the report;
formatting the selected reporting object so as to create filters that apply to its computation context, thereby modifying the contents of its instances and the computation context of all its contained reporting objects.

13. The method of claim 7 wherein a dimension member attribute is placed into a container or in an axis, thereby automatically adding the dimension to which this attribute applies into the axis of the reporting object.

14. The method of claim 7 further comprising:
selecting an existing reporting object in the report; and
formatting the selected reporting object so as to create breaks or sorts thereby modifying the layout of its instances.

15. The method of claim 7 further comprising:
displaying an analysis user interface;
selecting an instance of a cell in the report;
utilizing a GUI tool to select an OLAP analysis action to be performed;
retrieving a computation context of the cell instance as a function of dimension members selected in the axes of the cell instancets direct and indirect containing reporting object; and
performing the selected OLAP analysis action with respect to this computation context.

* * * * *

UNITED STATES PATENT AND TRADEMARK OFFICE
CERTIFICATE OF CORRECTION

| | |
|---|---|
| PATENT NO. | : 7,356,779 B2 |
| APPLICATION NO. | : 11/000597 |
| DATED | : April 8, 2008 |
| INVENTOR(S) | : Cras et al. |

Page 1 of 1

It is certified that error appears in the above-identified patent and that said Letters Patent is hereby corrected as shown below:

Claim 8 Column 8, line 20 should read:

"The method of claim 7 with nested reporting objects that ..."

Claim 15 Column 8, line 57 should read:

"...the cell ~~instancets~~ instance's direct and indirect containing report-..."

Signed and Sealed this

Thirtieth Day of November, 2010

David J. Kappos
*Director of the United States Patent and Trademark Office*